(12) United States Patent
Liu (10) Patent No.: US 11,839,241 B2
(45) Date of Patent: Dec. 12, 2023

(54) ARTICLE OF CLOTHING AND MANUFACTURING METHOD THEREOF

(71) Applicant: Regina Miracle International (Group) Limited, Hong Kong (CN)

(72) Inventor: Zhenqiang Liu, Hong Kong (CN)

(73) Assignee: Regina Miracle International (Group) Limited, Kwai Chung (CN)

( * ) Notice: Subject to any disclaimer, the term of this patent is extended or adjusted under 35 U.S.C. 154(b) by 671 days.

(21) Appl. No.: 16/978,666

(22) PCT Filed: Mar. 7, 2019

(86) PCT No.: PCT/CN2019/077309
§ 371 (c)(1),
(2) Date: Sep. 4, 2020

(87) PCT Pub. No.: WO2019/170124
PCT Pub. Date: Sep. 12, 2019

(65) Prior Publication Data
US 2020/0397064 A1     Dec. 24, 2020

(30) Foreign Application Priority Data

Mar. 7, 2018   (WO) ................ PCT/CN2018/078272

(51) Int. Cl.
*A41B 9/14*      (2006.01)
*A41C 3/10*      (2006.01)
(Continued)

(52) U.S. Cl.
CPC .................. *A41B 9/14* (2013.01); *A41C 3/10* (2013.01); *A41C 3/142* (2013.01); *A41C 5/005* (2013.01);
(Continued)

(58) Field of Classification Search
CPC ............ A41C 5/005; A41C 3/10; A41C 3/142
See application file for complete search history.

(56) References Cited

U.S. PATENT DOCUMENTS

2005/0114989 A1    6/2005  Harward
2007/0287358 A1*  12/2007  Lau .................... A41D 27/245
                                                          156/73.3

FOREIGN PATENT DOCUMENTS

CN       1277273 A     12/2000
CN       1933746 A      3/2007
(Continued)

OTHER PUBLICATIONS

Authorized Officer: Feng, Jie, International Search Report issued in counterpart PCT application No. PCT/CN2019/077309, dated May 30, 2019, 6 pp.
(Continued)

*Primary Examiner* — Gloria M Hale
(74) *Attorney, Agent, or Firm* — KAPLAN BREYER SCHWARZ, LLP (57) ABSTRACT

An article of clothing is disclosed. The article of clothing a front panel. The front panel comprises an inner fabric layer; an outer fabric layer having a first portion and a second portion; and a thermoplastic strip. The first portion of the outer fabric layer is secured with the inner fabric layer. The second portion of the outer fabric layer supports the thermoplastic strip therewith. The back panel is attached to the front panel.

20 Claims, 7 Drawing Sheets

(51) Int. Cl.
*A41C 3/14* (2006.01)
*A41C 5/00* (2006.01)
*A41F 9/00* (2006.01)
*D06H 5/00* (2006.01)

(52) U.S. Cl.
CPC ................ *A41F 9/00* (2013.01); *D06H 5/00* (2013.01); *A41B 2300/20* (2013.01); *A41B 2300/52* (2013.01); *A41B 2500/50* (2013.01)

(56) References Cited

FOREIGN PATENT DOCUMENTS

| CN | 101158110 A | 4/2008 |
| CN | 101233964 A | 8/2008 |
| CN | 103169161 A | 6/2013 |
| CN | 104334043 A | 2/2015 |
| CN | 104582516 A | 4/2015 |
| CN | 105308235 A | 2/2016 |
| CN | 105338846 A | 2/2016 |
| CN | 105407752 A | 3/2016 |
| CN | 107467756 A | 12/2017 |
| JP | 2015-017343 A | 1/2015 |

OTHER PUBLICATIONS

Authorized Officer: Feng, Jie, Written Opinion issued in counterpart PCT application No. PCT/CN2019/0773, dated May 24, 2019, 5 pp.
Authorized Officer: Ma, Chi, International Search Report issued in priority PCT application No. PCT/CN2018/078272, dated Dec. 7, 2018, 3 pp.
Authorized Officer: Ma, Chi, Written Opinion issued in priority PCT application No. PCT/CN2018/078272, dated Dec. 4, 2018, 5 pp.

* cited by examiner

ARTICLE OF CLOTHING AND MANUFACTURING METHOD THEREOF

CROSS-REFERENCE TO RELATED APPLICATIONS

This application claims priority to International Application No. PCT/CN2018/078272, filed on Mar. 7, 2018 and entitled "Article of clothing and manufacturing method thereof," the entire disclosure of which is hereby incorporated by reference.

FIELD OF THE PRESENT DISCLOSURE

The present disclosure relates generally to articles of clothing, and in particular, to an article of clothing, such as a brasserie, having an elastic portion supported therein to allow for expansion and contraction thereof.

BACKGROUND

Various garments, such as bras, T-shirts, pants, etc., incorporate elastic portions, for example around neck portion or in shoulder portion thereof. These elastic portions are capable of expanding and contracting, and thus may aid with supporting the garment against the body of a wearer. Conventionally, in order to allow for such expansion and contraction of the elastic portions, rubber material has been employed. The rubber material is often sewn or adhered to the portions of the garments that are to be made elastic. To wear or remove the garment, force is applied to the elastic portions, and the rubber material allows the elastic portions to expand to moderate elongations. Once the applied force to the elastic portions is removed, the rubber material causes the elastic portions to regain their original shape from the expanded state, thus providing a snug fit against the body of the wearer.

However, typical rubber material tends to lose its elastic properties after repeated stretching over a period of time. Once the rubber material losses its elastic properties, the elastic portions of the garment be likely to get loose, with limited or no expanding and contracting capabilities. Therefore, the garment after multiple uses may not be able to provide consistent expansion and/or contraction as desired by the wearer. Such garments often become unfit to be used, unless the rubber material is replaced with a new rubber material.

Accordingly, there is a need of article of clothing with elastic portions which can retain elastic properties even after repeated and prolonged usage, leading to an increase in overall life span of the garments.

SUMMARY

In one aspect, an article of clothing is disclosed. The article of clothing comprises a front panel and a back panel. The front panel comprises an inner fabric layer, an outer fabric layer and a thermoplastic strip. The outer fabric layer has a first portion and a second portion. The first portion of the outer fabric layer is secured or at least in part secured with the inner fabric layer. The second portion of the outer fabric layer supports the thermoplastic strip therewith. The back panel is attached to the front panel.

In one or more embodiments, a section of the second portion of the outer fabric layer is folded inward to at least partially enclose the thermoplastic strip therein.

In one or more embodiments, the front panel further comprises a cover fabric layer attached to and extending from the outer fabric layer such that the cover fabric layer and the outer fabric layer, in combination, at least partially enclose the thermoplastic strip therein.

In one or more embodiments, the article of clothing further comprises a cup region defined in the front panel. The cup region is formed within the first portion of the outer fabric layer in the front panel. The article of clothing further comprises a pad arranged in the cup region. The pad is located between the outer fabric layer and the inner fabric layer in the front panel.

In one or more embodiments, the inner fabric layer of the front panel comprises slits formed therein to allow for insertion of the pad in the front panel.

In one or more embodiments, the inner fabric layer is secured to the outer fabric layer of the front panel by an adhesive layer subjected to heating.

In one or more embodiments, the thermoplastic strip is secured to the second portion of the outer fabric layer by hot-pressing technique.

In one or more embodiments, the back panel comprises a fabric sheet and a thermoplastic strip, wherein the fabric sheet is folded over to at least partially enclose the thermoplastic strip of the back panel therein.

In one or more embodiments, the thermoplastic strip of the front panel is located at a bottom edge thereof, and wherein the thermoplastic strip of the back panel is located at a bottom edge thereof.

In one or more embodiments, both the thermoplastic strip of the front panel and the thermoplastic strip of the back panel include perforations formed therein.

In another aspect, a method of manufacturing an article of clothing is disclosed. The article of clothing comprises a front panel and a back panel attached to the front panel. The front panel comprises an inner fabric layer, an outer fabric layer having a first portion and a second portion, and a thermoplastic strip. The first portion of the outer fabric layer is secured or at least in part secured with the inner fabric layer, and the second portion of the outer fabric layer supports the thermoplastic strip therewith. The method comprises providing an inner fabric layer and an outer fabric layer for forming the front panel. The method further comprises molding the front panel to define bra cups in a cup region thereof. The method further comprises securing the outer fabric layer with the inner fabric layer. The method further comprises placing a thermoplastic strip proximal to a bottom of the outer fabric layer. The method further comprises molding the thermoplastic strip to the outer fabric layer for adhering thereto. The method further comprises attaching a back panel to the front panel.

In one or more embodiments, a section of the second portion of the outer fabric layer is folded inward to at least partially enclose the thermoplastic strip therein.

In one or more embodiments, the front panel further comprises a cover fabric layer attached to and extending from the outer fabric layer such that the cover fabric layer and the outer fabric layer, in combination, at least partially enclose the thermoplastic strip therein.

In one or more embodiments, the thermoplastic strip is formed by injection molding of thermoplastic material.

In one or more embodiments, the inner fabric layer is secured to the outer fabric layer of the front panel by an adhesive layer subjected to heating.

In one or more embodiments, the thermoplastic strip is molded with the outer fabric layer by hot-pressing technique.

In one or more embodiments, one or more of temperature and duration for hot-pressing the thermoplastic strip to the outer fabric layer is less than one or more of temperature and duration for molding the front panel.

In yet another aspect, a brasserie is disclosed. The brasserie comprises a front panel and a back panel. The front panel comprises an inner fabric layer, an outer fabric layer and a thermoplastic strip. The outer fabric layer has a first portion and a second portion. The first portion of the outer fabric layer is secured or at least in part secured with the inner fabric layer. A section of the second portion of the outer fabric layer is folded inward to at least partially enclose the thermoplastic strip therein. The back panel is attached to the front panel. A cup region is defined in the front panel. The cup region is formed within the first portion of the outer fabric layer in the front panel. A pad arranged in the cup region. The pad is located between the outer fabric layer and the inner fabric layer in the front panel.

In one or more embodiments, the inner fabric layer is secured to the outer fabric layer of the front panel by an adhesive layer subjected to heating.

In one or more embodiments, the thermoplastic strip is secured to the second portion of the outer fabric layer by hot-pressing technique.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments.

The embodiments are described herein for illustrative purposes and are subject to many variations. It is understood that various omissions and substitutions of equivalents are contemplated as circumstances may suggest or render expedient, but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Where there is reference to the word "layer" it is to be understood that it may have its common definition and, but not limited to that the layer could consist of one panel or may have regions that are defined by two or more panels that are joined and that may each be of a different characteristic (e.g. color, thickness, material, orientation, size).

Figure 1A:
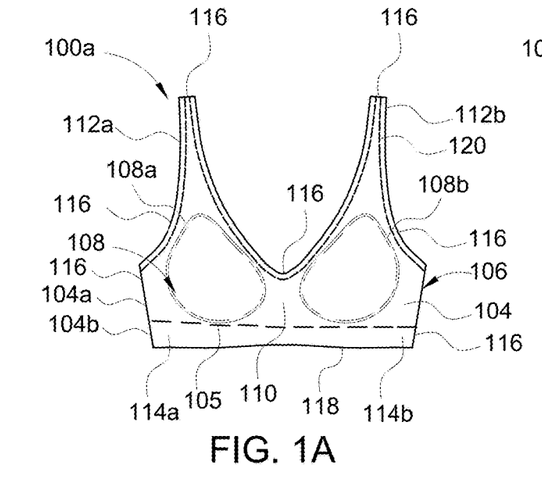
FIG. 1A illustrates a front diagrammatic view of a front panel of an article of clothing, in accordance with one or more embodiments of the present disclosure.
Figure 1B:
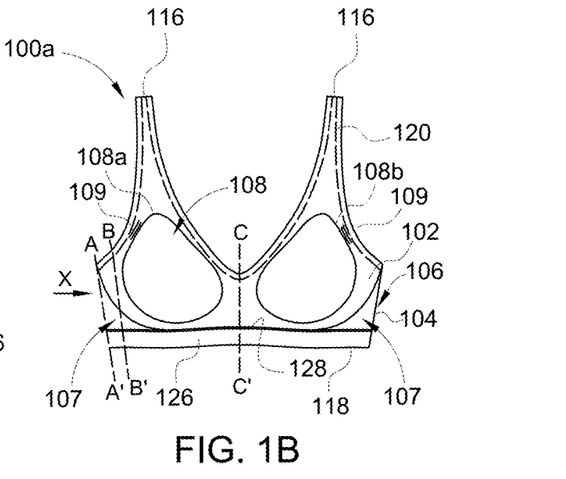
FIG. 1B illustrates a rear diagrammatic view of the front panel of the article of clothing of FIG. 1A, in accordance with one or more embodiments of the present disclosure.
Figure 1C:
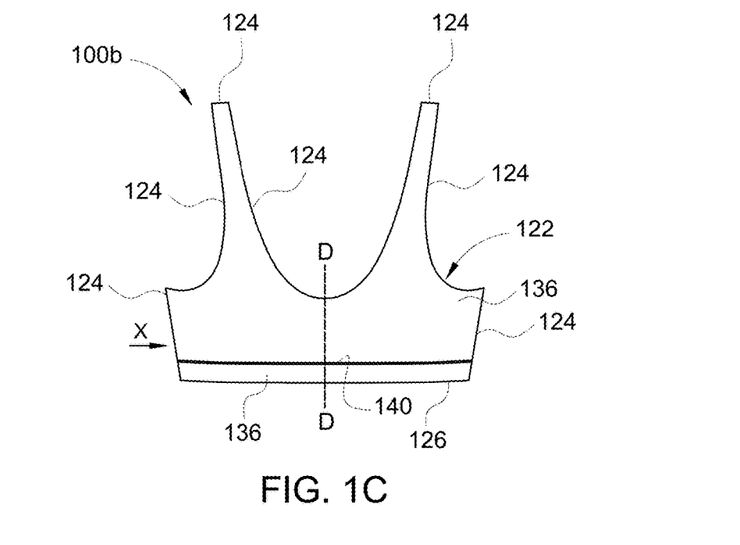
FIG. 1C illustrates a diagrammatic view of a back panel of the article of clothing, in accordance with one or more embodiments of the present disclosure.

Referring to the accompanied drawings, FIGS. 1A-1C illustrate diagrammatic views of panels of an article of clothing (not labelled herein), in accordance with one or more embodiments of the present disclosure. In particular, FIGS. 1A-1B illustrate a front panel 100a of the article of clothing and FIG. 1C illustrates a back panel 100b of the article of clothing. In the present examples, the front panel 100a and the back panel 100b are joined together to complete the article of clothing. The article of clothing may be any garment which may be worn by a wearer. For example, the article of clothing may be, but not limited to, a brassiere, a bra top, a sports top, a pantie, a T-shirt, a pant or a trouser, and the like. In the exemplary illustrations of FIGS. 1A-1C, the article of clothing is shown to be a brassiere, in particular a sports bra or a bra top; and the said terms have been interchangeably used herein without any limitations. It may be appreciated that although the embodiments of the present disclosure have been described in terms of the article of clothing being the sports bra or bra top, the disclosed embodiments would also be applicable for other types of articles of clothing with or without minor modifications which may be easily contemplated by a person having ordinary skill in the clothing industry.

Referring to FIG. 1A and FIG. 1B in combination, the front panel 100a includes an inner fabric layer 102 and an outer fabric layer 104. The inner fabric layer 102 is better illustrated in FIG. 1B which depicts a rear diagrammatic view of the front panel 100a, while the outer fabric layer 104 is better illustrated in FIG. 1A which depicts a front diagrammatic view of the front panel 100a. In FIG. 1B, the outer fabric layer 104 is shown arranged behind the inner fabric layer 102. In the front panel 100a, the inner fabric layer 102 and the outer fabric layer 104 are preferably two separate fabric sheets. In particular, the inner fabric layer 102 is a one-piece fabric sheet and the outer fabric layer 104 is also a one-piece fabric sheet.

As shown in FIG. 1A, the outer fabric layer 104 has a first portion 104a and a second portion 104b. It may be understood that, and as also discussed, the outer fabric layer 104 is a one-piece fabric sheet and its two portions 104a and 104b are divided by a virtual boundary (such as, a boundary 105 as shown in FIG. 1A) therein. The first portion 104a extends generally from a top of the outer fabric layer 104 to the cup region 108 defined therein, and the second portion 104b extends generally downwards from a bottom of the first portion 104a thereof. The first portion 104a may generally correspond to portion of the outer fabric layer 104 which is in contact with or overlaps the inner fabric layer 102, and the second portion 104b may generally correspond to portion of the outer fabric layer 104 which is not in contact with or does not overlap the inner fabric layer 102, in the front panel 100a. It may be seen from the drawings, the first portion 104a of the outer fabric layer 104 is secured with the inner fabric layer 102, or is at least in part secured with the inner fabric layer 102 since the outer fabric layer 104 may not be secured with the inner fabric layer 102 at the cup region 108, in the first portion 104a, so as to allow the insertion or removal of a pad located between the inner fabric layer 102 and the outer fabric layer 104. In other words, the inner fabric layer 102 is attached to and overlaps the outer fabric layer 104 at the first portion 104a, in the front panel 100a. The inner fabric layer 102 has no overlap with the outer fabric layer 104 at the second portion 104b, in the front panel 100a. Such an arrangement of the front panel 100a is discussed in more detail in the proceeding paragraphs and further in reference to FIGS. 2A-2C.

As illustrated in FIG. 1A and FIG. 1B, the front panel 100a of the article of clothing provides a body structure 106 which defines shape and purpose of the article of clothing. The body structure 106, herein, generally represents three-dimensional shape of the front panel 100a in the article of clothing. In the present exemplary article of clothing, the body structure 106 includes a cup region 108 which includes a pair of bra cups, including a first bra cup 108a and a second bra cup 108b. In particular, the cup region 108 is defined in the first portion 104a of the outer fabric layer 104 in the front panel 100a. In one or more examples, a pad (not shown) is arranged in the cup region 108. In particular, each of the bra cups 108a and 108b is provided with one pad therein. It may be understood that the pads are located between the outer fabric layer 104 and the inner fabric layer 102 in the front panel 100a, with the pads separating the outer fabric layer 104 and the inner fabric layer 102 at the pair of bra cups 108a and 108b, in the cup region 108. In one or more examples, the inner fabric layer 102 of the front panel 100a may include slits (such as, slits 109 depicted in FIG. 1B) formed therein to allow for insertion of the pad in the front panel 100a.

Further, as illustrated in FIG. 1A and FIG. 1B, the front panel 100a includes a center gore 110 extending between and connecting the first bra cup 108a and the second bra cup 108b. A pair of straps, including a first strap 112a and a second strap 112b are attached to the cup region 108 at the peripheries of the first bra cup 108a and the second bra cup 108b, respectively. Further, a pair of side wings, including a first side wing 114a and a second side wing 114b, are attached to the cup region 108 at the peripheries of the first bra cup 108a and the second bra cup 108b, respectively. It may be contemplated that the pair of straps 112a and 112b support the article of clothing on shoulders of the wearer, while the pair of side wings 114a and 114b support the article of clothing around a torso of the wearer. As may be seen from FIG. 1A and FIG. 1B, the front panel 100a may include portions of the straps 112a, 112b and the side wings 114a, 114b therein. In some examples, the article of clothing may not include the pair of straps 112a and 112b, and may only include the pair of side wings 114a and 114b which may support the article of clothing on the wearer.

As shown in FIGS. 1A-1B, the body structure 106 has one or more edges 116, such as side edges and top edges in the front panel 100a. In the illustrated examples, the body structure 106 also provides an edge 118 extending along a bottom of the pair of side wings 114a and 114b and the cup region 108 thereof, in the front panel 100a. In the present disclosure, the edge 118 has been differently labelled and, sometimes, interchangeably referred to as bottom edge 118 for the purpose of clarity and not to be confused with the other edges 116. The bottom edge 118 is generally extending along in the second portion 104b of the outer fabric layer 104, in the front panel 100a.

It may be seen that the inner fabric layer 102 is attached to the outer fabric layer 104 at the edges 116 corresponding to the first portion 104a of the outer fabric layer 104. In one embodiment, the inner fabric layer 102 is attached to the outer fabric layer 104 at the edges 116 by using an adhesive. In another embodiment, the inner fabric layer 102 is attached to the outer fabric layer 104 at the edges 116 by utilizing sewing or welding techniques, as known in the art. In case of sewing or welding technique being utilized, the inner fabric layer 102 is attached to the outer fabric layer 104 along the edges 116 at exemplary marked lines 120 generally formed parallel to the respective edges 116 (as exemplary depicted in the illustrated examples of FIGS. 1A-1B). As may be better seen from FIG. 1B, the second portion 104b of the outer fabric layer 104 is not overlapped with the inner fabric layer 102, in the front panel 100a.

Referring now to FIG. 1C, the back panel 100b also provides a body structure 122. The body structure 122, herein, generally represents shape of the back panel 100b which may be two-dimensional or three-dimensional, as required for the article of clothing. In the back panel 100b, the body structure 122 provides one or more edges 124, such as side edges and top edges. The back panel 100b further comprises a bottom edge 126 therein. In the present examples, the back panel 100b is formed of a single fabric sheet which may be folded at the bottom edge 126. As may be seen from FIG. 1C, the back panel 100b may include portions corresponding to the portions of the straps 112a, 112b and the side wings 114a, 114b in the front panel 100a.

As discussed in the preceding paragraphs, the front panel 100a and the back panel 100b are joined together to complete the article of clothing. In the present examples, the front panel 100a and the back panel 100b may be joined together at the respective edges, i.e. one or more of the edges 116 or of the edges 124. The front panel 100a and the back panel 100b are generally placed such that the corresponding regions are aligned, and the edges 116 and the edges 124 are stitched or welded together. That is, the front panel 100a and the back panel 100b are arranged such that the portions corresponding to the straps 112a, 112b and the side wings 114a, 114b in the front panel 100a and the back panel 100b are aligned with each other. Such joining techniques are well known in the art and thus have not been described herein.

Figure 2A:
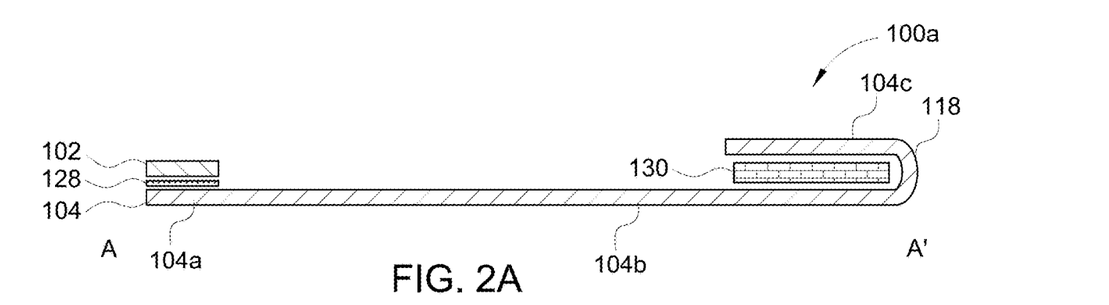
FIG. 2A illustrates a sectional view of the front panel of FIG. 1B along a section A-A', in accordance with one or more embodiments of the present disclosure.
Figure 2B:
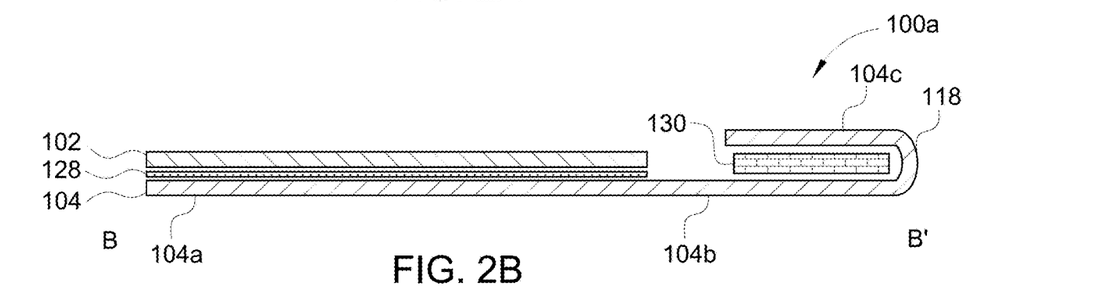
FIG. 2B illustrates a sectional view of the front panel of FIG. 1B along a section B-B', in accordance with one or more embodiments of the present disclosure.
Figure 2C:
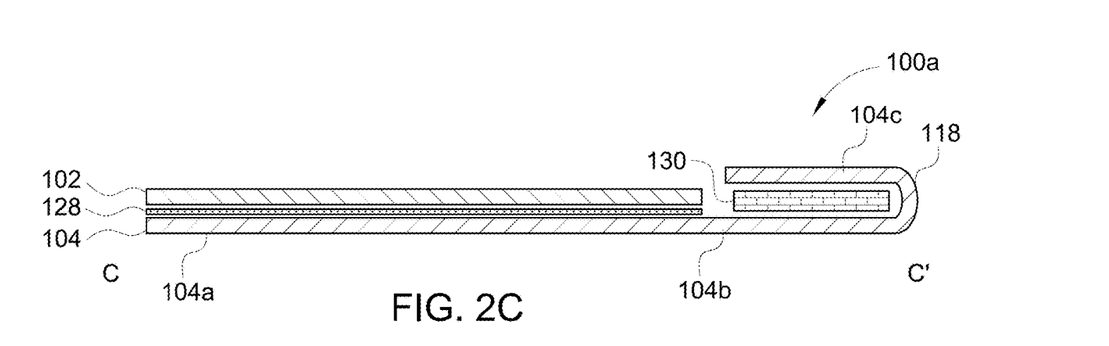
FIG. 2C illustrates a sectional view of the front panel of FIG. 1B along a section C-C', in accordance with one or more embodiments of the present disclosure.

Referring now to FIGS. 2A-2C, sectional views of the front panel 100a along different sections A-A', B-B' and C-C' (as shown in FIG. 1B) are respectively illustrated, in accordance with one or more embodiments of the present disclosure. For instance, as illustrated in FIG. 2A, it may be understood that the outer fabric layer 104 is folded. In particular, the second portion 104b of the outer fabric layer 104 is folded. Specifically, a section 104c (as also may be seen from FIG. 1B) of the second portion 104b of the outer fabric layer 104 is folded inward, towards the inner fabric layer 102, in the front panel 100a. It may be seen from FIG. 1B and FIG. 2A in combination, the inner fabric layer 102 extends and overlaps the outer fabric layer 104 up to the cup region 108 in the front panel 100a, and thereafter the body structure 106 of the front panel 100a only includes the outer fabric layer 104 with no overlap of the inner fabric layer 102 in the front panel 100a.

Further, as illustrated in FIG. 2A, the inner fabric layer 102 is attached to the outer fabric layer 104 by an adhesive layer 128. In the present embodiments, the adhesive layer 128 extends between the inner fabric layer 102 and the outer fabric layer 104. In particular, the adhesive layer 128 extends only along the first portion 104a of the outer fabric layer 104. In one or more examples, the adhesive layer 128 may be formed by applying an adhesive, in the form of a solution or the like, to one or more of the contact surfaces of the inner fabric layer 102 and the outer fabric layer 104. In other examples, the adhesive layer 128 may be formed by using an adhesive film which may be placed between the contact surfaces of the inner fabric layer 102 and the outer fabric layer 104. It may be appreciated by a person skilled in the art that the adhesive layer 128 attaches the inner fabric layer 102 and the outer fabric layer 104 subjected to heating thereof (as discussed more in detail in the proceeding paragraphs).

According to embodiments of the present disclosure, the front panel 100a includes a thermoplastic strip 130 arranged therein. As illustrated in FIG. 2A, the second portion 104b of the outer fabric layer 104 supports the thermoplastic strip 130 therewith. In accordance with an embodiment of the present disclosure, the second portion 104b of the outer fabric layer 104 is folded along the bottom edge 118 to at least partially enclose the thermoplastic strip 130 therein. It may be understood that the thermoplastic strip 130 is supported in the front panel 100a at the bottom edge 118 by the section 104c of the second portion 104b of the outer fabric layer 104. The thermoplastic strip 130 is also shown in the illustration of FIG. 1B as may be visible in case of partial enclosing thereof by the outer fabric layer 104 in the front panel 100a. In one or more examples, the thermoplastic strip 130 may include a plurality of perforations (not shown) formed therein.

According to preferred embodiment of the present disclosure, the thermoplastic strip 130 is secured to the second portion 104b of the outer fabric layer 104 by hot-pressing molding technique. That is, first the thermoplastic strip 130 is supported by the second portion 104b of the outer fabric layer 104, for example in the fold formed due to folding of the second portion 104b of the outer fabric layer 104. Thereafter, the thermoplastic strip 130 is hot-pressed with the section 104c to be secured with the outer fabric layer 104. In some embodiments, the thermoplastic strip 130 may be directly secured with the second portion 104b of the outer fabric layer 104, for example to a bottom edge of the outer fabric layer 104, without the need of folding thereof. In other examples, the thermoplastic strip 130 may be secured to the outer fabric layer 104 using any other suitable known techniques, such as by using adhesives, etc. without departing from the scope of the present disclosure.

In one example, the thermoplastic strip 130 is generally in the shape of a thin rectangular strip of a certain thickness. In alternative examples, the thermoplastic strip 130 may be of any other suitable shape and size as per the requirements of the elastic portion to be formed therewith and used in the article of clothing. In an embodiment of the present disclosure, the thermoplastic strip 130 is formed by injection molding of a thermoplastic material. The injection molding allows the thermoplastic strip 130 to be formed into various shapes and sizes depending upon the shape and size of the required thermoplastic layer to be formed therefrom. In alternative embodiments, the thermoplastic strip 130 may be formed by any other suitable process known in the art without any limitations.

Thermoplastic materials, also sometimes referred to as thermoplastic elastomers (TPE) or thermoplastic rubbers (TPR), are a class of copolymers or a physical mix of polymers (usually a plastic and a rubber) which consist of materials with both thermoplastic and elastomeric properties. Thermoplastic materials show advantages typical of both rubbery materials and plastic materials. The benefit of using thermoplastic materials is the ability to stretch to moderate elongations and return to its near original shape creating a longer life and better physical range than other materials. Examples of thermoplastic materials which are widely available in the market include, but not limited to, Hytrel, Dryflex, Mediprene, Kraton, Pibiflex, Sofprene, Laprene, Sofprene, Dryflex, Santoprene, Termoton, Solprene, etc., to name a few.

FIG. 2B illustrates the sectional view of the front panel 100a along the section B-B', as seen from direction 'X' in FIG. 1B. As described with reference to FIG. 1B and FIG. 2A, it may be seen from FIG. 1B and FIG. 2B, in combination, that the inner fabric layer 102 extends and overlap the outer fabric layer 104 up to the cup region 108 in the front panel 100a, and thereafter the body structure 106 of the front panel 100a only includes the outer fabric layer 104 with no overlap of the inner fabric layer 102 in the front panel 100a. It may be appreciated that the inner fabric layer 102 extends more along the section B-B' as compared to the section A-A' (as shown in FIG. 1B) in the front panel 100a of the article of clothing. FIG. 2C illustrates the sectional view of the front panel 100a along the section C-C'. As described with reference to FIG. 1B and FIG. 2A, it may be seen from FIG. 1B and FIG. 2C, in combination, that the inner fabric layer 102 extends and overlaps the outer fabric layer 104 up to the cup region 108 in the front panel 100a, and thereafter the body structure 106 of the front panel 100a only includes the outer fabric layer 104 with no overlap of the inner fabric layer 102 in the front panel 100a. It may be appreciated that the inner fabric layer 102 extends even more along the section C-C' as compared to the section B-B' (as shown in FIG. 1B) in the front panel 100a of the article of clothing.

Such arrangement of the front panel 100a provides that the second portion 104b of the outer fabric layer 104 may have triangular regions, such as regions 107 proximal to the side wings 114a and 114b, as shown in FIGS. 1A-1B in combination. In particular, the inner fabric layer 102 gradually reduces in length, as seen from the direction 'X' in FIG. 1B, approximating the curvature of the cup region 108, for example towards the left end of the front panel 100a (as seen from the inner side of FIG. 1B). With this gradual reduction in length (as seen from the direction 'X' in FIG. 1B), at the second portion 104b, there is a region 107, which is approximately triangular in shape, where only the outer fabric layer 104 is present and the inner fabric layer 102 is absent. The reduced inner fabric layer 102 or the absence of the inner fabric layer 102 at regions 107 of the front panel 100a increases the elasticity at those regions which contributes to enhanced comfort around the armpit region. For example, such positioning of the second portion 104b of the outer fabric layer 104 allows the side wings 114a and 114b to expand or contract easily, and thus provides for better comfort to the wearer and aesthetics to the article of clothing.

Figure 3:
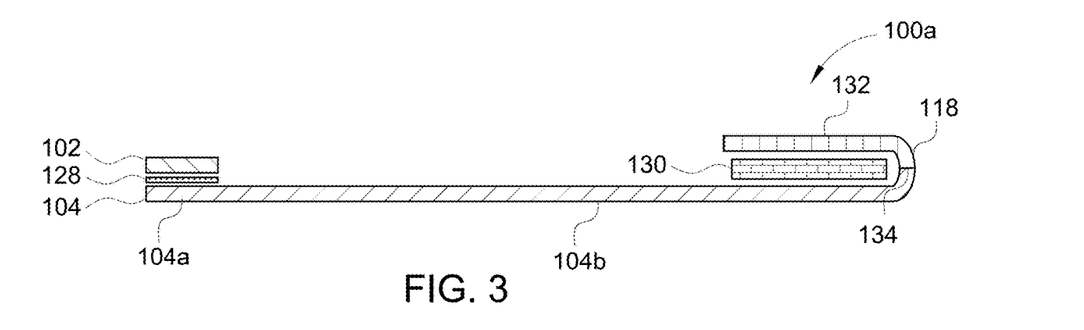
FIG. 3 illustrates a sectional view of the back panel of FIG. 1C along a section D-D', in accordance with one or more embodiments of the present disclosure.

FIG. 3 illustrates a section view of the front panel along the section A-A' as seen from the direction 'X' in FIG. 1B, in accordance with an alternate embodiment of the present disclosure. In the said alternate embodiment, the front panel 100a further includes a cover fabric layer 132 attached to and extending from the outer fabric layer 104. In the illustration of FIG. 3, the cover fabric layer 132 attached to the outer fabric layer 104 at a joint 134. It may be appreciated that the cover fabric layer 132 may be attached to the second portion 104b of the outer fabric layer 104 by any suitable technique, such as use of adhesive, sewing, welding, etc. without any limitations. In the front panel 100a of FIG. 3, the cover fabric layer 132 is arranged to be generally parallel to the second portion 104b of the outer fabric layer 104, such that the cover fabric layer 132 and the outer fabric layer 104, in combination, at least partially enclose the thermoplastic strip 130 therein. It may be appreciated by a person skilled in the art that the embodiment as described in reference to FIG. 3 herein, which is complementary to embodiment of FIG. 2A, may also apply to the configuration of the front panel 100a as described in FIGS. 2B and 2C without departing from the scope of the present disclosure, and thus have not been repeated herein for the brevity of the present disclosure.

Figure 4:
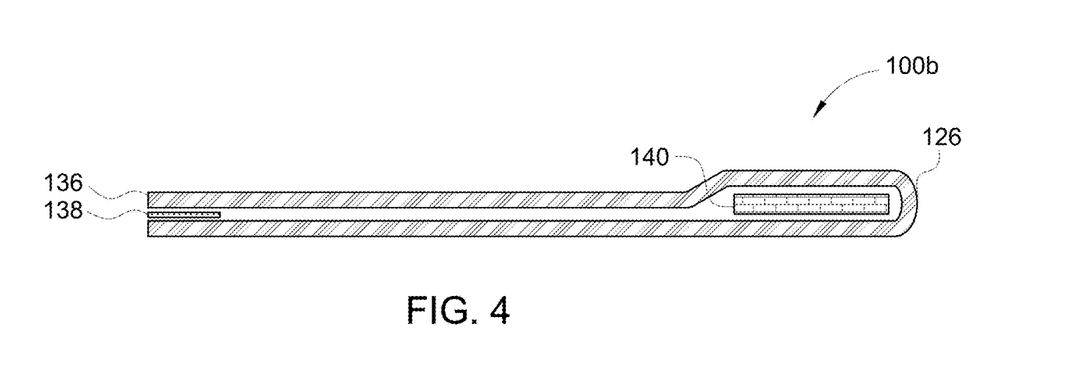
FIG. 4 illustrates a sectional view of the front panel of FIG. 1B along a section A-A', in accordance with an alternate embodiment of the present disclosure.

FIG. 4 illustrates a section view of the back panel 100b along a section D-D' as seen from the direction 'X' (as shown in FIG. 1C). As discussed, the back panel 100b is formed of a single fabric sheet 136 which may be folded at the bottom edge 126 thereof. The folded fabric sheet 136 may be joined at its ends at one or more of the edges 124 by an adhesive layer 138, which may be similar to the adhesive layer 128 (as described in reference to FIGS. 2A-2C). In one or more embodiments of the present disclosure, the back panel 100b may also include a thermoplastic strip 140 supported therein. As may be seen, the thermoplastic strip 140 may be supported at the bottom edge 126 thereof. The thermoplastic strip 140 is also shown in the illustration of FIG. 1C as may be visible in case of partial enclosing thereof by the fabric sheet 136 in the back panel 100b.

In one or more embodiments of the present disclosure, the thermoplastic strip 130 is secured to the second portion 104b of the outer fabric layer 104 by hot-pressing technique. Similarly, the thermoplastic strip 140 is secured to the fabric sheet 136 by hot-pressing technique. The thermoplastic strips 130 and 140 form the elastic portions in the article of clothing. The thermoplastic strips 130 and 140 are formed along and co-extensive with the respective edges 118 and 126 of the body structures 106 and 122, respectively. The thermoplastic strip 130 may be extending along the entire length of the bottom edge 118 of the body structure 106. Similarly, the thermoplastic strip 140 may be extending along the entire length of the edge 126 of the body structure 122. In some examples, the article of clothing may have multiple elastic portions, using the thermoplastic strips 130 and 140, formed along various edges thereof. For instance, it may be understood that although the edge 118 is shown to be extending along the bottom of the body structure 106; in other examples, the edge 118 may be any of the other edges 116, such as, a side edge or a top edge, of the body structure 106 without any limitations. These elastic portions formed by the thermoplastic strips 130 and 140 allow the article of clothing 100 to expand and contract. It may be understood that the body structures 106 and 122 provide the external appearance to the article of clothing and the incorporated elastic portions allow the article of clothing to be worn and removed conveniently.

Figure 5A:
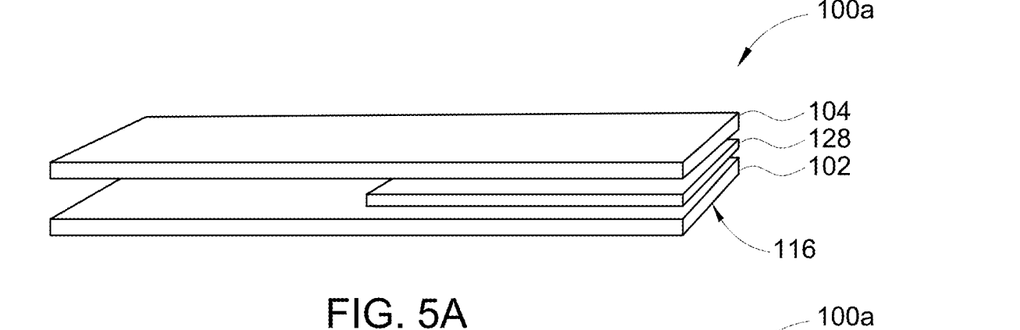
FIGS. 5A-5D illustrate sectional views along an edge of the article of clothing, in accordance with different embodiments of the present disclosure.
Figure 5B:
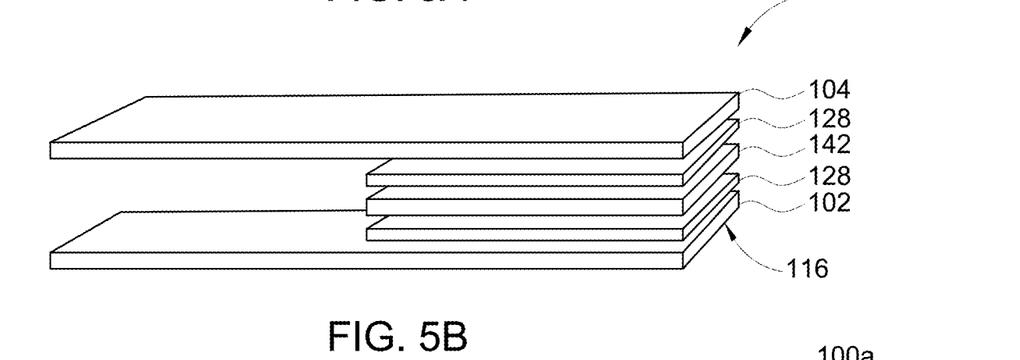
Figure 5C:
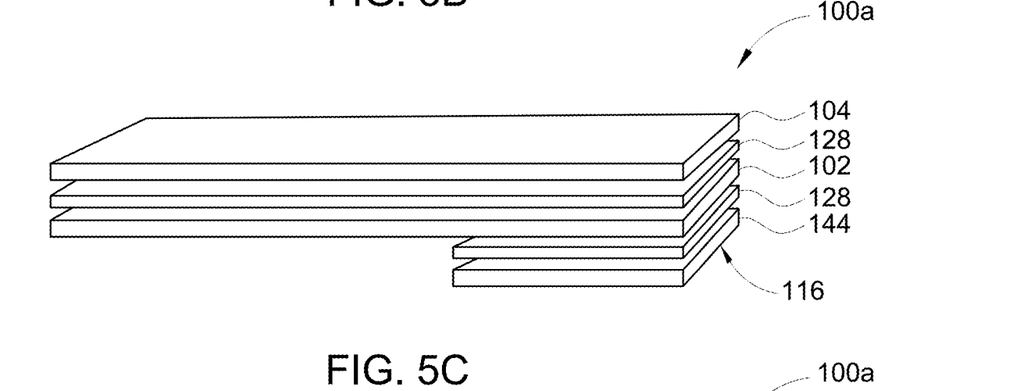
Figure 5D:
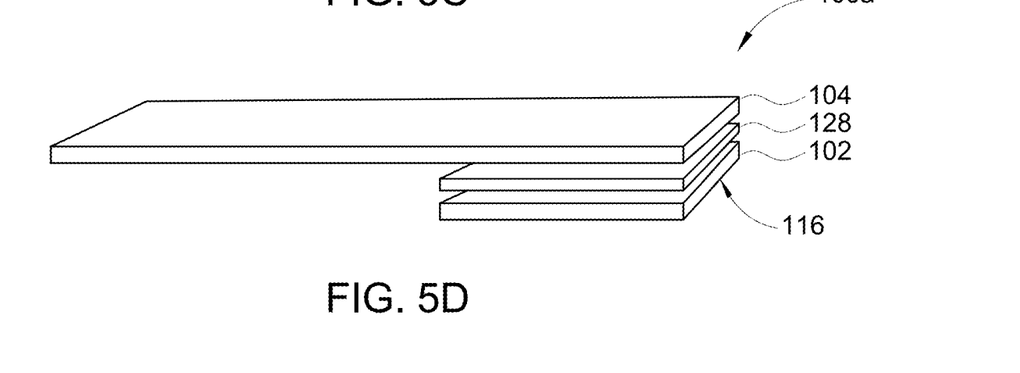

FIGS. 5A-5D illustrate sectional views along any one of the edges (such as the edges 116 and/or edges 124) of the article of clothing, in accordance with different embodiments of the present disclosure. In the given illustrations, the various layers have been represented in the form of planar sheets for explanation purposes only; however, the various layers may extend beyond the given size of the sheets; and thus the illustrations shall not be construed as limiting to the present disclosure. In an embodiment, as illustrated in FIG. 5A, the edge (e.g., the edge 116) of the front panel 100a may have the inner fabric layer 102 and the outer fabric layer 104 joined together simply by one adhesive layer (like, the adhesive layer 128). In another embodiment, as illustrated in FIG. 5B, the edge (e.g., the edge 116) of the front panel 100a may include a rubber layer 142 arranged between the inner fabric layer 102 and the outer fabric layer 104, which in turn are joined to the rubber layer 142 and to each other by two adhesive layers (like, the adhesive layer 128). In one or more examples, the rubber layer 142 is a Spandex layer. In other examples, the rubber layer 142 may be composed of other elastic materials without departing from the scope of the present disclosure. In yet another embodiment, as illustrated in FIG. 5C, the edge (e.g., the edge 116) of the front panel 100a may include a fabric strip 144 which may be joined to the inner fabric layer 102, and the three layers, including the outer fabric layer 104, the inner fabric layer 102 and the fabric strip 144 are joined together by two adhesive layers (like, the adhesive layer 128). The fabric strip 144 is extending only to a small length beyond the edge, as compared to the outer fabric layer 104, to be in contact with and provide supported to the wearer. In still another embodiment, as illustrated in FIG. 5D, the edge (e.g., the edge 116) of the front panel 100a may have the inner fabric layer 102 extending only to a small length beyond the edge, and attached to the outer fabric layer 104 by an adhesive layer (like, the adhesive layer 128). In all of these embodiments as shown in FIG. 5A to 5D, the edge 116 is a "free cut" edge, and is not subject to edge processing, such as sewing, welding or hemming at the edge, after cutting.

In one or more embodiments, the elastic portions including the thermoplastic strip, such as portions with the thermoplastic strips 130 and 140, may optionally include a rubber layer therewith. In one or more examples, the rubber layer may be composed of Spandex material. In other examples, the rubber layer may be composed of other elastic materials without any limitations. The rubber layer is generally located adjacent to the thermoplastic strip; however, in other examples, the rubber layer may be separate from the thermoplastic strip without any limitations. Herein, both the thermoplastic strip and the rubber layer are co-extensive in the elastic portions.

The present disclosure further provides a method of manufacturing the article of clothing as herein disclosed. The method includes providing the inner fabric layer 102 and the outer fabric layer 104 for forming the front panel 100a. As discussed, the inner fabric layer 102 and the outer fabric layer 104 are separate fabric sheets which may be placed together to form the front panel 100a. The method further includes molding the front panel 100a to define the bra cups 108a and 108b in the cup region 108 thereof. The molding process may involve pressing molds with certain predefined shapes, such as shapes of the bra cups 108a and 108b, against the fabric sheets of the inner fabric layer 102 and the outer fabric layer 104. The method further includes securing the outer fabric layer 104 with the inner fabric layer 102. In particular, the inner fabric layer 102 (with the molded shape) is secured to the outer fabric layer 104 (with the molded shape) of the front panel 100a by the adhesive layer 128 subjected to heating. In some embodiments, the inner fabric layer 102 is not secured to the outer fabric layer 104 at the cup region 108, to enable a pad located between the inner fabric layer 102 and the outer fabric layer 104 to be inserted or removed through a slit which for example is formed on the inner fabric layer 102. The method further includes placing the thermoplastic strip 130 proximal to a bottom (such as, the bottom edge 118) of the outer fabric layer 104. The method further includes molding the thermoplastic strip 130 to the outer fabric layer 104 for adhering thereto. The method further includes attaching the back panel 100b to the front panel 100a.

In other examples, the method of manufacturing the article of clothing may be carried out by first forming the front panel 100a with the inner fabric layer 102 and the outer fabric layer 104 secured together by the adhesive layer 128 subjected to heating, then defining the cup region 108 in the front panel 100a by molding, then supporting, by at least partially enclosing, the thermoplastic strip 130 with the outer fabric layer 104, in the front panel 100a, subsequently molding the thermoplastic strip 130 to the outer fabric layer 104, and thereafter attaching the back panel 100b to the front panel 100a.

Herein, in one or more examples, the thermoplastic strip 130 is formed by injection molding of thermoplastic material. As discussed, in one embodiment, the section 104c of the second portion 104b of the outer fabric layer 104 is folded inward to at least partially enclose the thermoplastic strip 130 therein. In another embodiment, the cover fabric layer 132 is attached to and extend from the outer fabric layer 104 such that the cover fabric layer 132 and the outer fabric layer 104, in combination, at least partially enclose the thermoplastic strip 130 therein. The thermoplastic strip 130 is secured to the outer fabric layer 104 by hot-pressing molding technique. Such two-step molding is required because the temperature and duration required for purposes of molding the bra cups 102 and 108b in the cup region 108 of the front panel 100a and heat pressing the thermoplastic strip 130 with the outer fabric layer 104 of the front panel 100a may be different from each other. In the embodiments of the present disclosure, one or more of temperature and time duration for hot-pressing the thermoplastic strip 130 to the outer fabric layer 104 may be generally less than one or more of temperature and time duration for molding the front panel 100a to define the bra cups. For example, molding of the front panel 100a to define bra cups in the cup region 108 may involve temperature in the range of 175 to 195 degrees Celsius and a time duration of 120 to 250 seconds, while molding or hot pressing the thermoplastic strip 130 to the outer fabric layer 104 for adhering thereto may involve temperature in the range of 100 to 150 degrees Celsius and a time duration of 20 to 60 seconds. It may be appreciated that this may also be the reason that the bra cups 108a and 108b are first molded in the front panel 100a, and thereafter the thermoplastic strip 130 is hot-pressed therein. So a two-step molding process, rather than a one-step molding process, is preferably employed in the manufacture of embodiments of the article of clothing of the present disclosure.

It may be understood that the manufacturing setup for joining the thermoplastic strip 130 to the outer fabric layer 104, utilizing hot pressing process, may include dies which are pressed against each other at a suitably high temperature for implementing the hot pressing process. It may be contemplated that there may be a power supply means, such as a hydraulic power supply means, to provide power for pressing of the dies against each other. In some examples, only one die may be employed for hot pressing process.

Due to such hot pressing of the thermoplastic strip 130 with the outer fabric layer 104, a substantially stretchable thermoplastic layer is formed with the outer fabric layer 104. Hereinafter, such stretchable thermoplastic layer as formed in the article of clothing is being generally referred to as "elastic portion" for the article of clothing. The substantially stretchable thermoplastic layer allows the article of clothing to stretch to moderate elongations at the edges once an external force is applied thereon, and regain its original length once the external force applied thereon is removed. It may be understood that when hot pressed, the thermoplastic strip 130 may be embedded with the outer fabric layer 104 to form the thermoplastic layer. No adhesive is required to join the thermoplastic strip 130 with the outer fabric layer 104. Owing to hot pressing of the thermoplastic strip 130, the thermoplastic material infiltrates into the outer fabric layer 104 in the surface(s) to which the thermoplastic strip 130 is in contact with. The infiltration of the thermoplastic material allows for permanent joining of the thermoplastic strip 130 with the outer fabric layer 104, forming the thermoplastic layer therewith. In some examples, when the thermoplastic strip 130 is hot pressed to form the thermoplastic layer, the formed thermoplastic layer may have a plurality of perforations. The perforations in the thermoplastic layer, along with the outer fabric layer 104, allows for ventilation in the article of clothing.

Figure 6:
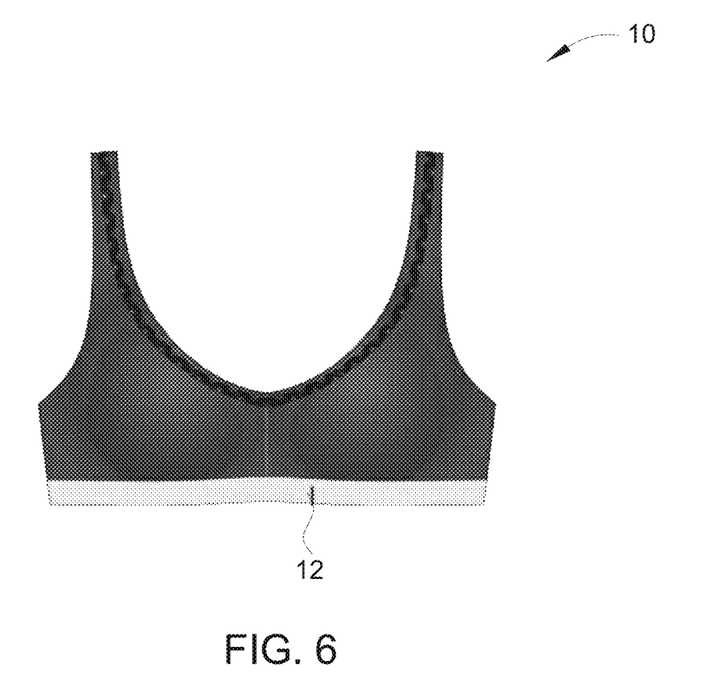
FIG. 6 illustrates a diagrammatic view of an exemplary article of clothing, in accordance with one or more embodiments of the present disclosure.
Figure 7:
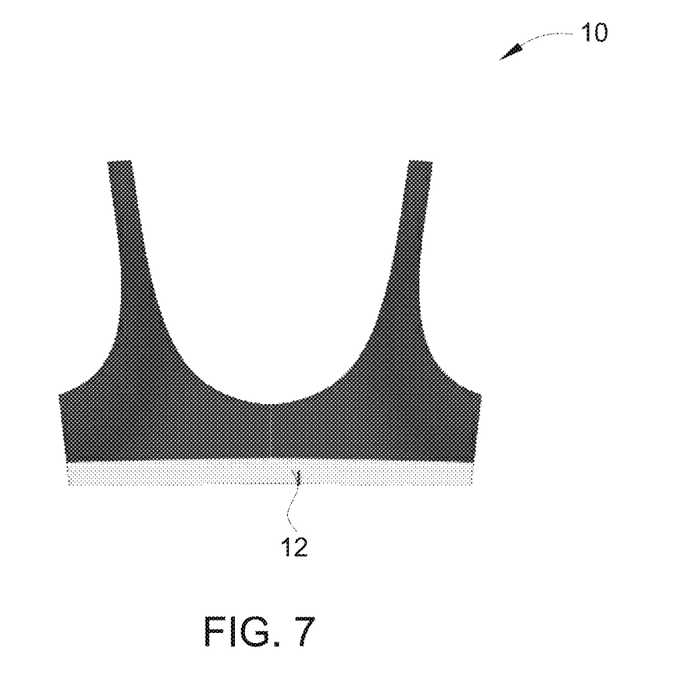
FIG. 7 illustrates a diagrammatic view of an exemplary article of clothing, in accordance with one or more embodiments of the present disclosure.
Figure 8:
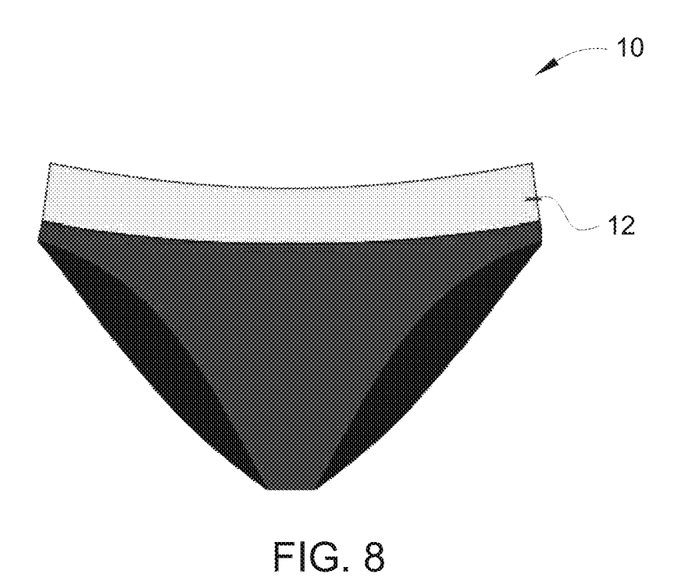
FIG. 8 illustrates a diagrammatic view of an exemplary article of clothing, in accordance with one or more embodiments of the present disclosure.
Figure 9:
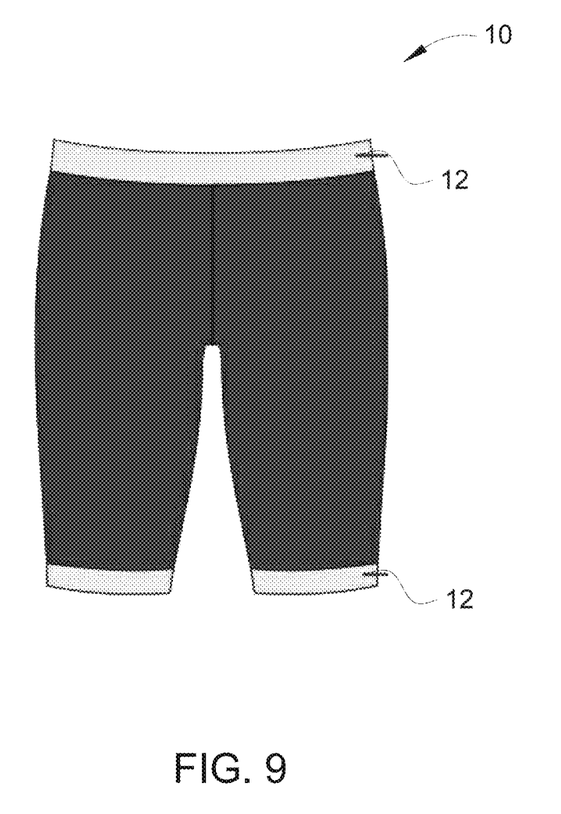
FIG. 9 illustrates a diagrammatic view of an exemplary article of clothing, in accordance with one or more embodiments of the present disclosure.
Figure 10:
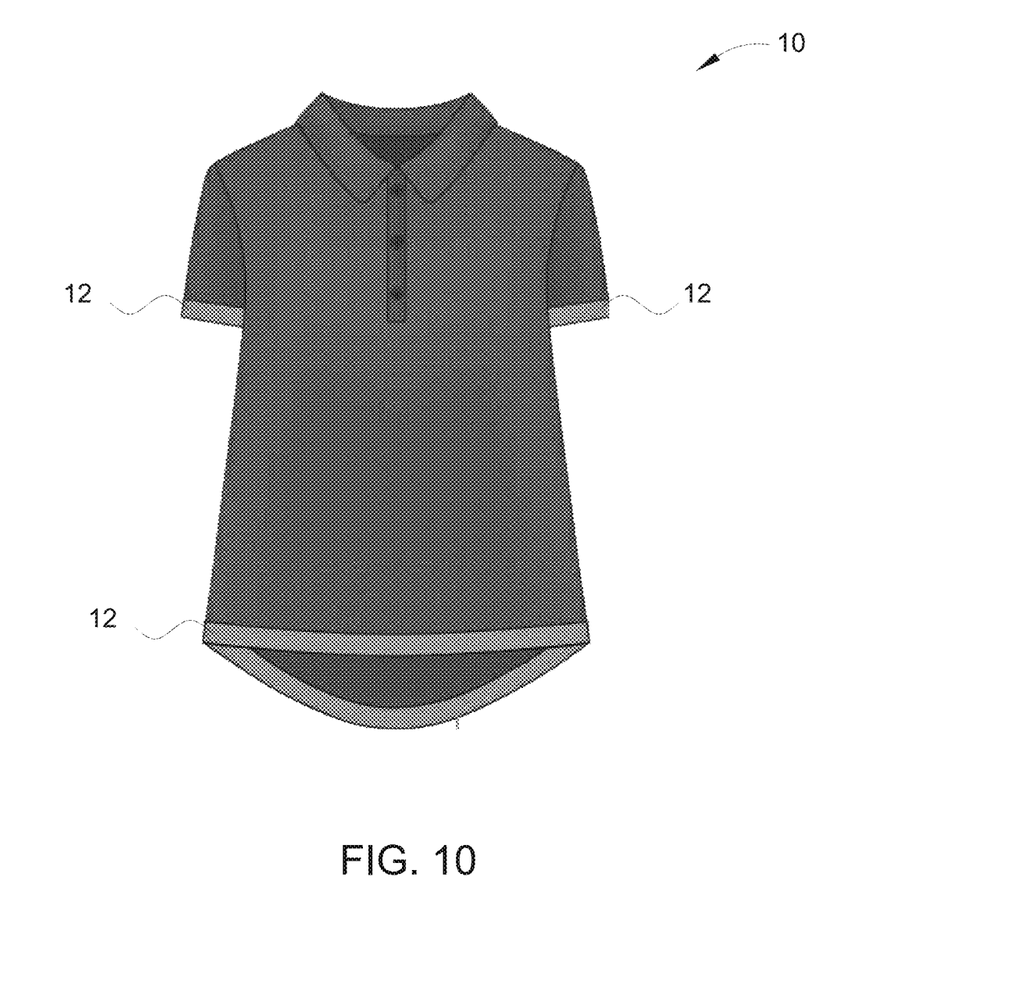
FIG. 10 illustrates a diagrammatic view of an exemplary article of clothing, in accordance with one or more embodiments of the present disclosure.

In examples as illustrated in FIGS. 6 and 7, the article of clothing (generally referred by the numeral 10) is shown to be a bra top. The elastic portion (generally referred by the numeral 10), with the thermoplastic layer therein, is provided along a bottom edge thereof. In some examples, the elastic portion 12 may also be provided on shoulder straps (not labelled) of the article of clothing 10. In another example disclosed in FIG. 8, the article of clothing 10 is shown to be an underwear. In this example, the elastic portion 12, with the thermoplastic layer therein, is formed along a waist line of the article of clothing 10. Similarly, in example of FIG. 9 in which the article of clothing 10 is shown to be pants, the elastic portion 12, with the thermoplastic layer therein, is formed at a waistline or a bottom thereof. In another example as disclosed in FIG. 10 in which the article of clothing 10 is shown to be a T-shirt, multiple elastic portions 12, with the corresponding thermoplastic layers therein, are provided and located at one or more locations, such as, but not limited to, waistline, neckline, end of arms, bottom of shirt, etc.

The elastic portion, with the thermoplastic layer therein, allows the corresponding edge along which it is extending, to expand and contract in the article of clothing 10 on application of force. Since the thermoplastic material retains its elastic properties over a long period of time, the garments 10, such as the garments 10 illustrated in FIGS. 6-10 utilizing the elastic portion 100 of the present disclosure, remain usable over a long period of time. The implementation of thermoplastic layer may result in better elastic properties while eliminating the need of using adhesives for securing the two fabric layers 102 and 104 in the elastic portion. Further, the elastic portion with the disclosed thermoplastic layer provides a stiff feeling to the wearer and a hard appearance from the outside for the article of clothing 10, which is desirable. Further, the thermoplastic layer may provide good "hand feel," i.e., a soft touch for the elastic portion compared to utilizing conventional elastic materials, such as rubber.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:

1. An article of clothing comprising:
    a front panel comprising:
        an inner fabric layer;
        an outer fabric layer having a first portion and a second portion; and
        a thermoplastic strip,
        wherein:
            the first portion of the outer fabric layer is at least in part secured with the inner fabric layer,
            only the first portion of the outer fabric layer overlaps the inner fabric layer, and
            the second portion of the outer fabric layer supports the thermoplastic strip therewith;
    and
    a back panel attached to the front panel.

2. The article of clothing of claim 1, wherein a section of the second portion of the outer fabric layer is folded inward to at least partially enclose the thermoplastic strip therein.

3. The article of clothing of claim 1, wherein the front panel further comprises a cover fabric layer attached to and extending from the outer fabric layer such that the cover fabric layer and the outer fabric layer, in combination, at least partially enclose the thermoplastic strip therein.

4. The article of clothing of claim 1 further comprising:
    a cup region defined in the front panel, wherein the cup region is formed within the first portion of the outer fabric layer in the front panel; and
    a pad arranged in the cup region, wherein the pad is located between the outer fabric layer and the inner fabric layer in the front panel.

5. The article of clothing of claim 4, wherein the inner fabric layer of the front panel comprises slits formed therein to allow for insertion of the pad in the front panel.

6. The article of clothing of claim 1, wherein the inner fabric layer is secured to the outer fabric layer of the front panel by an adhesive layer subjected to heating.

7. The article of clothing of claim 1, wherein the thermoplastic strip is secured to the second portion of the outer fabric layer by hot-pressing technique.

8. The article of clothing of claim 1, wherein the back panel comprises a fabric sheet and a thermoplastic strip, wherein the fabric sheet is folded over to at least partially enclose the thermoplastic strip of the back panel therein.

9. The article of clothing of claim 8, wherein the thermoplastic strip of the front panel is located at a bottom edge thereof, and wherein the thermoplastic strip of the back panel is located at a bottom edge thereof.

10. The article of clothing of claim 9, wherein both the thermoplastic strip of the front panel and the thermoplastic strip of the back panel include perforations formed therein.

11. A method of manufacturing an article of clothing, the article of clothing comprising a front panel and a back panel attached to the front panel, the front panel comprising an inner fabric layer, an outer fabric layer having a first portion and a second portion, and a thermoplastic strip, wherein the first portion of the outer fabric layer is at least in part secured with the inner fabric layer and the second portion of the outer fabric layer supports the thermoplastic strip therewith, the method comprising the steps of:
    providing an inner fabric layer and an outer fabric layer for forming the front panel;
    overlapping only a first portion of the outer fabric layer over the inner layer;
    molding the front panel to define bra cups in a cup region thereof;
    securing the outer fabric layer with the inner fabric layer;
    placing a thermoplastic strip proximal to a bottom of the outer fabric layer;
    molding the thermoplastic strip to the outer fabric layer for adhering thereto; and
    attaching a back panel to the front panel.

12. The method of claim 11, wherein a section of the second portion of the outer fabric layer is folded inward to at least partially enclose the thermoplastic strip therein.

13. The method of claim 11, wherein the front panel further comprises a cover fabric layer attached to and extending from the outer fabric layer such that the cover fabric layer and the outer fabric layer, in combination, at least partially enclose the thermoplastic strip therein.

14. The method of claim 11, wherein the thermoplastic strip is formed by injection molding of thermoplastic material.

15. The method of claim 11, wherein the inner fabric layer is secured to the outer fabric layer of the front panel by an adhesive layer subjected to heating.

16. The method of claim 11, wherein the thermoplastic strip is molded with the outer fabric layer by hot-pressing technique.

17. The method of claim 16, wherein one or more of temperature and duration for hot-pressing the thermoplastic strip to the outer fabric layer is less than one or more of temperature and duration for molding the front panel.

18. A brassiere comprising:
a front panel comprising:
an inner fabric layer;
an outer fabric layer having a first portion and a second portion; and
a thermoplastic strip,
wherein:
the first portion of the outer fabric layer is at least in part secured with the inner fabric layer,
only the first portion of the outer fabric layer overlaps the inner fabric layer, and
a section of the second portion of the outer fabric layer is folded inward to at least partially enclose the thermoplastic strip therein;
a back panel attached to the front panel;
a cup region defined in the front panel, wherein the cup region is formed within the first portion of the outer fabric layer in the front panel; and
a pad arranged in the cup region, wherein the pad is located between the outer fabric layer and the inner fabric layer in the front panel.

19. The brassiere of claim 18, wherein the inner fabric layer is secured to the outer fabric layer of the front panel by an adhesive layer subjected to heating.

20. The brassiere of claim 18, wherein the thermoplastic strip is secured to the second portion of the outer fabric layer by hot-pressing technique.

* * * * *